R. STRESAU.
METHOD OF MANUFACTURING ELECTRICALLY WELDED TUBING.
APPLICATION FILED JULY 17, 1920.
1,359,001.
Patented Nov. 16, 1920.
2 SHEETS—SHEET 2.
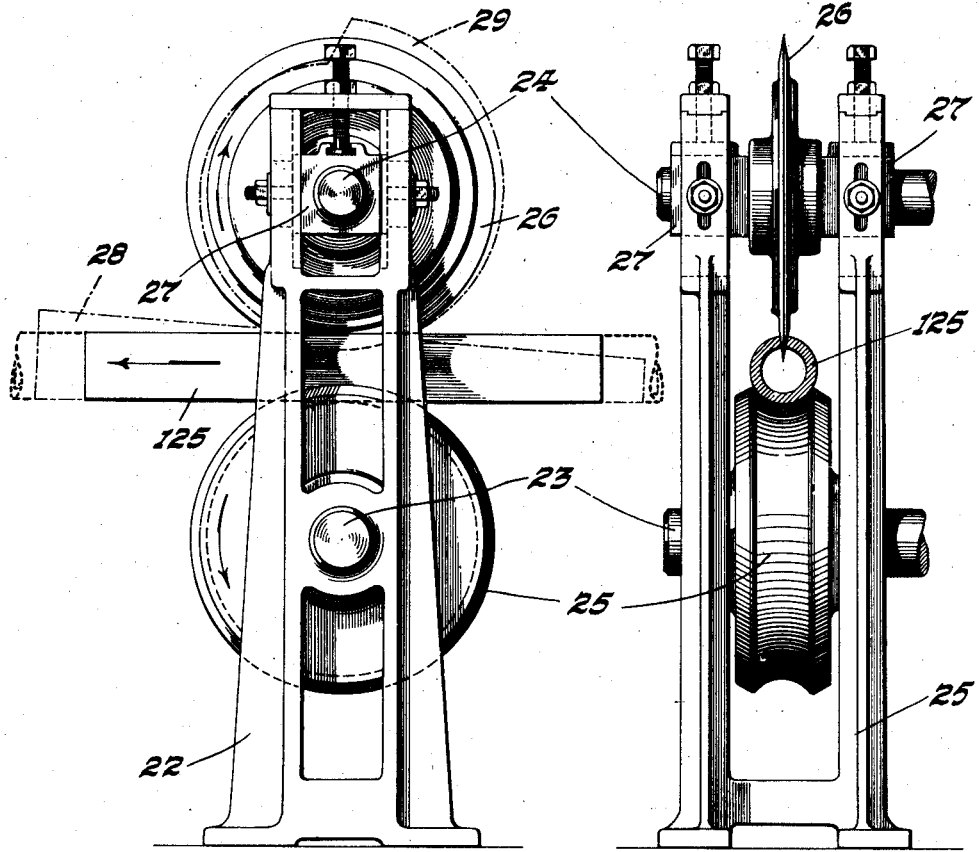
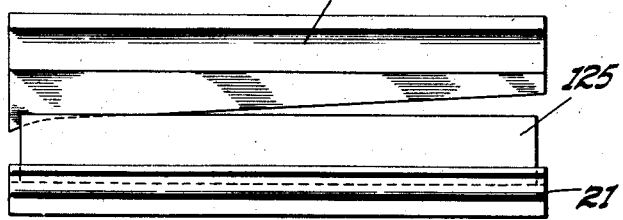
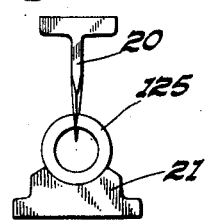
INVENTOR
Richard Stresau
Assignor to A.O. Smith Corp.
WITNESS
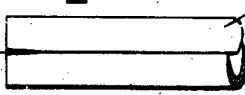
BY
Erwin, Whaler & Woolard
ATTORNEYS

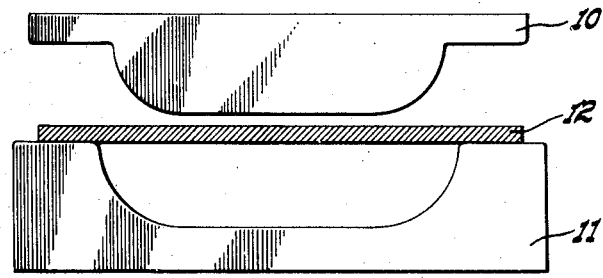
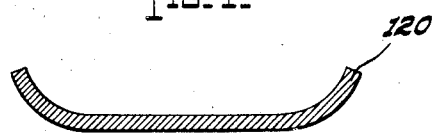
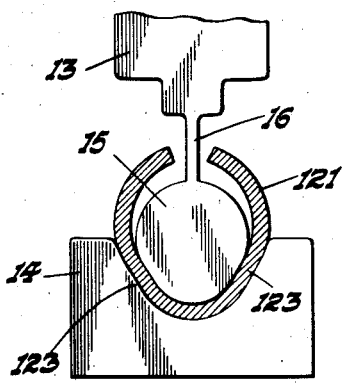
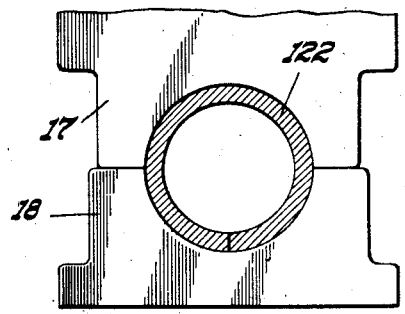
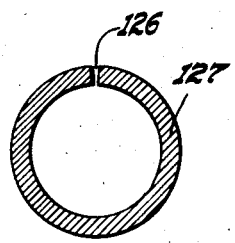
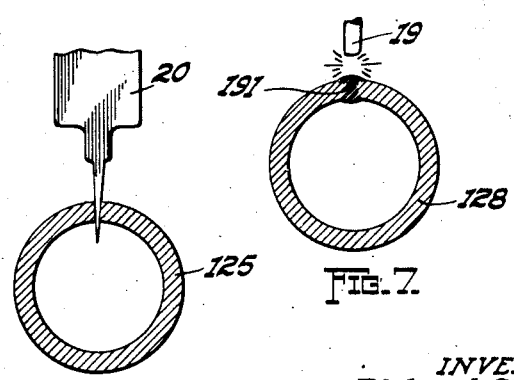

UNITED STATES PATENT OFFICE.

RICHARD STRESAU, OF WAUWAUTOSA, WISCONSIN, ASSIGNOR TO A. O. SMITH CORPORATION, OF MILWAUKEE, WISCONSIN, A CORPORATION OF NEW YORK.

METHOD OF MANUFACTURING ELECTRICALLY-WELDED TUBING.

1,359,001. Specification of Letters Patent. Patented Nov. 16, 1920.

Application filed July 17, 1920. Serial No. 396,883.

*To all whom it may concern:*

Be it known that I, RICHARD STRESAU, a citizen of the United States, and a resident of the city of Wauwautosa, in the county of Milwaukee and State of Wisconsin, have invented a certain new and useful Improvement in Methods of Manufacturing Electrically-Welded Tubing, (Case #160;) and I do declare the following to be a full, clear, and exact description thereof, such as will enable others skilled in the art of making welded tubing to practice my invention, reference being had to the accompanying drawings as illustrating some forms of mechanisms designed to carry my improved method into effect.

The invention relates to the process of manufacturing metal tubes.

The invention relates particularly to the process of manufacturing electrically welded tubes, in which an elongated tubular structure is formed from a metal strip, which is pressed or rolled into tubular form with the meeting edges thereof united by an electric welding operation, to complete the tube.

The present practice of thus making electrically welded tubes has been performed very satisfactorily, but an objection has arisen in applying such present practice to the production of tubes composed of stock of considerable gage. In forming the tubular section by pressing or rolling the blank into shape, the edges thereof are found in some cases to abut so closely that the seam is practically closed, and the electric arc in fusing the said edges is required to transmit its welding temperature from the outer surface of the tube. This practice requires the use of a current of very high amperage, in order that the remoter material at the welding line may be properly heated and brought to the desired state of fusion.

In the course of some experimentations in the field of electric welding, I have discovered that the welding operation described may be performed with much greater facility, if the parts constituting the joints to be welded are slightly separated prior to subjection to the welding operation. By means of this provision, the electric arc is permitted to play in the space between the separated edges or faces of the work, and thus heat such faces by direct application, so that the temperature of the parts may be more expeditiously raised to the fusing point.

My improved process involves the formation of the tubular structure from a flat metal strip, by pressing or rolling the same, so that a tube is formed from the strip with the edges in closely abutting contact, then subjecting the tubular structure to a wedging action, which latter will serve to slightly separate the edges so as to expose the opposite faces thereof, and leave a longitudinal opening or space, in which the electric arc may be played, to fuse the said edges or faces. The arcing current is transmitted by means of a destructible metallic electrode, which is fused coincidentally with the fusing of the local areas of the parts to be welded. The fused metal flowing from the said electrode is carried by the arc into the open joint in a quantity sufficient to completely fill the opening or space between the edges, produce a perfectly welded joint, which, along the welded line, will have a thickness not less than that of the parts to be welded, so that a tube of uniform cross sectional construction will be produced.

The novelty of my invention will be pointed out in the appended claims.

The drawings which accompany this specification diagrammatically illustrate the succession of operations performed in producing a tubular section of uniform diameter from a metal strip or plate.

In such drawings, Figure 1 shows a pair of stamping dies, which, in the first step in the operation of producing the tube, are adapted to change the cross sectional area of a metal strip by imparting a lengthwise groove to the same.

Fig. 2 shows an end view, or it may be a section, of the trough like or U shaped strip, after the latter has been subjected to the bending operation of the dies shown in Fig. 1.

Fig. 3 illustrates a set of dies for performing the second step in the process, and also the conversion of the trough like strip of Fig. 2, into an irregular tubular structure.

Fig. 4 shows a set of dies, the operation of which completes the structure by exerting pressure upon the irregular tube shown in Fig. 3, and perfecting the cylindrical contour of the tube, the meeting edges of which are pressed into such close engagement as to practically close the joint or seam.

Fig. 5 shows a simple means for producing a slight separation of the meeting edges of the tube, formed as in Fig. 4, to provide a space or gap wherein which the electric arc may play, so that such edges may be fused at the same time that the arc is producing a welding temperature along the welding line.

Fig. 6 is an end view, or it may be a section, of the tubular section shown in Fig. 4, with its meeting edges slightly separated, for the purpose and in the manner described.

Fig. 7 is an end view, or it may be a section, of the tubular section as it appears upon completion of the welding operation.

Figs. 8 and 9 are respectively a side view and front view of a machine provided with a rotating wedge which is adapted to produce the separation between the edges of the tube, as the latter is fed through the said machine.

Figs. 10 and 11 are respectively a side view and an end view of wedging devices employed in a press, for separating the edges of the tube.

Fig. 12 is a fragmentary view illustrating a preparatory provision of means to permit the initial entry of the wedge between the meeting edges of the tubular structure to be welded, and facilitate the separation of such edges.

Referring now to the drawings, Fig. 1 shows a pair of ordinary stamping dies 10 and 11, which by their action in well known manner, are adapted to convert the sheet metal strip, or blank 12, into the cross sectional grooved form 120, shown in Fig. 2. The grooved strip 120 is then placed between a second pair of stamping dies 13 and 14, having the formation illustrated in Fig. 3, and by means of which dies the said strip is caused to assume what is approximately a tubular formation. The die member 13 is formed with a head 15, which is supported by a thin neck piece 16, extending the length of the head 15. By the operation of the dies 13 and 14, the grooved blank 120 will be converted into an approximately tubular structure 121, but with the edges sufficiently separated to permit the structure 121 to be pulled lengthwise from about the head 15. The hollow die member 14 is shaped to correspond with the head 15, and the shape of the dies 13 and 14, is such as to produce plane surfaces on opposite sides of the structure 121. In the third operation, the structure 121 is placed between two semi-circular stamping dies 17 and 18, which act to further change the configuration of the member 121, and produce a cylinder 122, of uniform diameter. The displacement of the plane surfaces 123, resulting from the pressure exerted by the semi-circular dies 17 and 18, causes the metal to flow so as to follow the contour of the said dies and perfect the cylindrical outline of the tube 122. The pressure thus exerted caused the meeting edges to engage each other so that the joint is practically closed.

The welding current is transmitted to the edges of the work to be welded by means of a destructible electrode 19, of usual construction. By reason of the joint at the edges being closed, it is required that the arc at the point of the electrode, heat the metal entirely through from the outer side, and this requires the application of a current of high amperage for a period longer than would be necessary, were the arc permitted to act upon the edges of the work, as well as the outer surface thereof at the welding line. To facilitate the operation of fusing the work, I propose to separate the meeting edges which have been compressed into engagement with each other by the dies of the forming press, so that the arc may play in the opening formed by such separation, and thus quickly create a fusing temperature in the work, by acting directly upon the separated edges thereof.

The separation of the edges of the work for the purposes of my invention, may be produced by any convenient means. A simple means for enabling this separation to be effected, resides in a wedge shaped die or blade 20, such as is illustrated in Figs. 5, 10 and 11, which may be forced into the seam in the tube 125, the latter being pillowed in a support 21, Fig. 11, so as to produce a longitudinal opening or gap 126, in the tubular section 127, Fig. 6.

Although the means referred to is effective, it is not suitable for rapid production, and for the latter purpose, I have devised a special machine of the form illustrated in Figs. 8 and 9. The said machine is composed of a frame 22, in which is journaled shafts 23 and 24. The shaft 23 drives a curved feeding roller 25, designed to feed the tubular sections in succession to the wedging device with rapidity. The shaft 24 carries a circular wedge 26, which will force its rotating edge into the seam of the tube and create a separation or gap of the desired width. The shaft 24 is mounted in adjustable bearings 27, by means of which the effective edge of the rolling wedge 26 may be adjusted to operate upon tubes of different diameter. The construction described enables the tubes to be fed with great rapidity through the machine.

When tapering tubular structures, such as is indicated by the dash and dot line 25, in Fig. 8, are being manufactured, the effective edge 29 of the rolling wedge may be formed as a spiral, the lesser radius of the spirally formed rotating wedge entering the seam at the larger end of the tube.

To facilitate the entry of the wedging means into the seam of the tube, I cut away a portion in the material so as to form a notch 30, at one end of the closed tube, as shown in Fig. 12. The wedging means will enter the notch at the commencement of the operation and will automatically adjust the tube upon its support in proper position for the further operation of the wedging means, as the latter forces the meeting edges of the tubular section apart to provide the desired space or gap in which the electric arc may play, to effectively fuse the metal from one side to the other, and produce in the cylinder 128, a perfectly welded joint, as indicated at 129, in Fig. 7. The best results will be obtained by employing a chill or cooling device of usual construction, during the operation of welding. The fused metal flowing from the destructible electrode will fill the space or gap by which the edges of the work are separated, and produce a joint of a thickness equal at least to the gage of the sheet from which the tube is formed.

Having thus described my invention, what I claim and desire to secure by Letters Patent of the United States, is:

1. The method of making electrically welded tubing, which comprises the steps of forming a metal strip into a tube with the meeting edges thereof in abutting contact, separating the said edges so as to provide an open space the length of the tube, and fusing the said edges by means of an electric arc.

2. The method of making electrically welded tubing, which comprises the steps of forming a metal strip into a tube with the meeting edges thereof in abutting contact, separating the said edges so as to provide an open space the length of the tube, fusing the said edges by means of an electric arc, and filling the said space with molten metal to perfect the joint.

3. The method of making electrically welded tubing, which comprises the steps of forming a metal strip into a tube with the meeting edges thereof in abutting contact, wedging the said edges apart so as to provide an open space the length of the tube, and fusing a current conducting electrode in the said open space, to fill the latter and complete the welded joint.

4. The method of making electrically welded tubing, which consists in forming a metal strip into a tube with the meeting edges thereof in abutting contact, wedging the said edges apart so as to provide an open space the length of the tube, conducting an electric current to the work by means of a destructible electrode to fuse the said edges, and simultaneously filling the said space with the molten metal flowing from the said electrode.

5. The method of making electrically welded tubing, which consists in separating the meeting edges of a rolled tubular structure so as to provide an open space, fusing the said edges by means of an electric arc playing in the said open space and simultaneously filling such open space by molten metal flowing from a fusible conducting electrode.

6. The method of making electrically welded tubing, which consists in bending a strip of metal into a trough, pressing the trough into a tube open at one side, then closing the said opening to complete the cylindrical contour of the tube and bring the meeting edges thereof in abutting contact, wedging the said edges apart to provide an open space the length of the tube, conducting an electric current to the said edges by means of a destructible electrode to fuse the latter, and filling the open space with metal flowing from the fusing electrode.

In testimony whereof, I have signed my name at Milwaukee, this 14" day of July, 1920.

R. STRESAU.

Witnesses:
  W. F. WOOLARD,
  C. THEO. OSTERBERG.